April 22, 1958 P. C. MACRIDES Re. 24,461

GARMENT CLOSURE

Original Filed Nov. 4, 1952

INVENTOR.
PHILIP C. MACRIDES
BY Max A. Farmer
ATT'Y

United States Patent Office

Re. 24,461
Reissued Apr. 22, 1958

24,461

GARMENT CLOSURE

Philip C. Macrides, Troy, N. Y., assignor to Cluett, Peabody & Co., Inc., Troy, N. Y., a corporation of New York Original No. 2,733,446, dated February 7, 1956, Serial No. 318,608, November 4, 1952. Application for reissue October 10, 1956, Serial No. 615,214

5 Claims. (Cl. 2—128)

Matter enclosed in heavy brackets [ ] appears in the original patent but forms no part of this reissue specification; matter printed in italics indicates the additions made by reissue.

This invention relates to garment closures, and particularly those emplyoed on the front of shirts of the negligee type.

An object of this invention is to provide an improved closure for germents which is particularly adaptable for the shirt front closure of negligee shirts, which will provide the appearance and have the advantages of the so-called French front type of shirt, which will be economical in the use of self material, which may be formed with a minimum of manual labor, which will require a minimum of preliminary training of operators who make the closures, which will present a neat and attractive appearance, and which will be relatively simple and inexpensive in construction.

Other objects and advantages will appear from the following description and several embodiments of the invention, and the novel features will be particularly pointed out hereinafter in connection with the appended claims.

Figure 1:
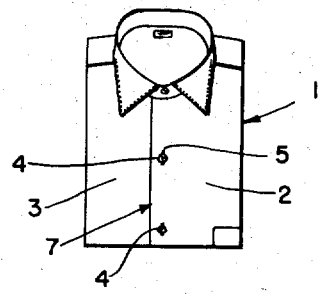
Fig. 1 is a front elevation of a shirt in folded condition, but constructed in accordance with this invention.
Figure 2:
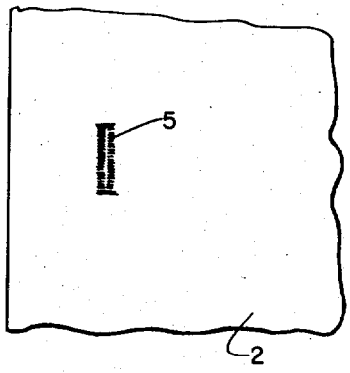
Fig. 2 is a front elevation on a full scale, of a portion of the outer panel of the shirt at the closure, and constructed in accordance with this invention.
Figure 3:
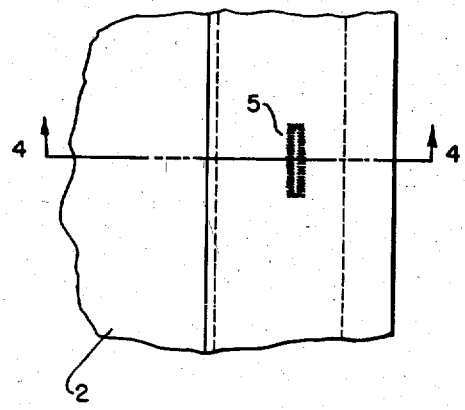
Fig. 3 is a rear elevation of same.
Figure 4:
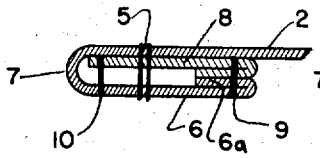
Fig. 4 is a sectional view of a portion of the panel edge shown in Fig. 3, the section being taken approximately along the line 4—4 of Fig. 3.

In the embodiment illustrated in Figs. 1 to 4, a negligee shirt 1 is provided with front panels 2 and 3, brought together in a somewhat overlapping relation to form a closure. The under panel 3 is provided with a plurality of buttons 4, disposed on the outer face of the panel adjacent to the free edge, and these buttons usually pass outwardly through button holes 5 in, and near the free edge of, the outer panel 2. The present invention involves changes in the panel 2. In accordance with this invention, a marginal strip area 6 of that portion of the front panel 2 which overlies the under panel 3, is folded back upon itself between the overlapping panels 2 and 3, along the line of fold 7 which then forms the free edge of the outer panel 2. This marginal strip area 6, at its free edge, is turned in between the marginal area 6 and the front panel 2, as at 6A. A reinforcing fabric strip 8 is disposed within the fold or space between the marginal strip area 6 and the front panel 2, so as to run lengthwise of the marginal strip area 6 for its full length, and it has a width approximately co-extensive with the width of the strip area 6. That side edge of the reinforcing strip which is remote from the fold line 7 is turned in between it and the strip area 6, and the marginal strip area and the reinforcing strip along their edges remote from the fold line 7 are united or secured together, preferably by a line of stitching 9 which runs lengthwise of the marginal strip area 6. The side edge of the reinforcing strip 8 which is adjacent to the fold line 7, is also united or secured to the adjacent side edge of the marginal strip area 6, such as by a line of stitching 10 which also runs lengthwise of the marginal strip area. The button hole 5 is formed through the superposed layers of the marginal strip area 6, the reinforcing strip 8, and the marginal area of the panel 2 overlying the area 6.

Figure 5:
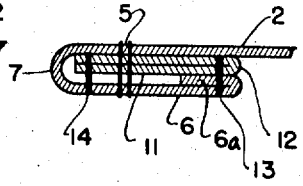
Fig. 5 is a similar sectional view, but illustrating another embodiment thereof.

In Fig. 5, the construction is generally similar to that shown in Figs. 1 to 4, except that the reinforcing strip is formed by folding a strip 11 of reinforcing fabric lengthwise to form a fold or edge 12 and this folded, or double layer of fabric which forms the reinforcing strip is then disposed between the folded back marginal strip area 6 and the overlying part of panel 2. This reinforcing strip 11, after folding, has a width which is approximately co-extensive with the width of the marginal strip area 6, and is disposed between the strip area 6 and the panel 2, with its fold edge 12 remote from the fold line 7 of the panel 2. The turned in edge 6a at the free edge of the marginal strip area 6, merely abuts against the double layers of the strip 11 and a line of stitching 13 unites both layers of the reinforcing strip 11, the marginal strip area 6, and the turned in edge 6a. The side edge of the folded reinforcing strip 11 which is adjacent to the fold line 7 of the panel 2 is secured to the adjacent side of the strip area 6 by stitching 14 which is similar to the stitching 10 of Fig. 4. The button hole 5 is formed in the superposed layers as explained in Fig. 4.

Figure 6:
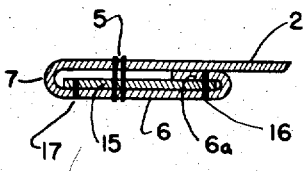
Fig. 6 is another sectional view similar to Fig. 4 but illustrating still another embodiment of the invention.

In the embodiment shown in Fig. 6, the panel 2 has its marginal strip area 6 formed as in Figs. 1 to 5, and a reinforcing strip 15 is disposed along the inside face of the strip area 6, with the turned in, free edge of the strip area 6 receiving in its fold, the adjacent edge of the reinforcing strip area 15. The marginal strip area 6, along the side remote from the fold line 7, and the adjacent edge of the reinforcing strip 15 and the turned in edge 6a are united, such as by a line of stitching 16, which runs lengthwise of the strip area 6. The edge of the reinforcing strip 15 which is adjacent to the fold line 7, is secured to the abutting part of the strip area 6, such as by a line of stitching 17 which passes through the strip 15 and strip area 6. The button hole 5 is formed as in Figs. 1 to 5.

Figure 7:
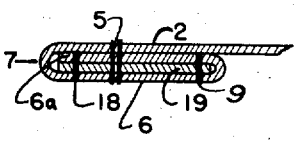
Fig. 7 is another sectional view similar to Fig. 6, but illustrating still another embodiment of the invention.

In Fig. 7, the turned in edge 6a extends into proximity to the fold line 7, and the lines of stitching 18 unite the turned back edge 6a, the reinforcing strip 19 and the strip area 6, along the portions adjacent to the fold line 7 and the opposite edge of strip 19. This construction shown in Fig. 7, however, uses somewhat more fabric than the construction shown in Figs. 1 to 6, but this construction shown in Fig. 7 is more uniform in thickness and less bumpy than the construction shown in Figs. 1 to 6.

Figure 8:
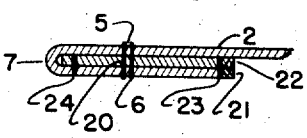
Fig. 8 is another sectional view similar to Fig. 6, but illustrating still another embodiment of the invention.

In Fig. 8 the panel 2 has its marginal strip area 6 folded back upon itself and a reinforcing fabric strip 20 is disposed within the fold or space between the marginal strip area 6 and the front panel 2 so as to run lengthwise of the marginal strip area 6, for its full length, its width being approximately co-extensive with the width of the strip area 6. The side edge 21 of the folded back portion of the panel 2 which is remote from the fold line 7 is preferably what is known as the selvage of the cloth. The corresponding edge 22 of the reinforcing fabric is also the selvage of the fabric. The marginal strip area 6 and the reinforcing fabric strip 20 along their edge portions remote from the fold line 7 are secured together or united, such as by a line of stitching 23 which runs lengthwise of the marginal strip area 6. The side edge portion of the reinforcing strip 20 which is adjacent to the fold line 7, is also united or secured to the adjacent or corresponding side edge portion of the marginal strip area 6, such as by a line of stitching 24 which also runs lengthwise of the marginal strip area.

While the saving in material cost is a prime factor in the above described invention, the savings realized in operations and assembly are greatly in excess of material savings. The labor cost of the hand cutting operation of the center plait is eliminated, the cutting patterns for the center plait are eliminated, the training period necessary to train a sewing machine operator in the intricacies of center plait assembly is eliminated, as are all the accounting and bookkeeping records which are necessary to accurately post job tickets at varying rates of pay for different piece work. The time required to train a hand cutter is about one year, and twelve weeks' time is required to train a sewing machine operator for operations on the center plait construction. These labor and expense savings, plus the saving in material cost, are important and long sought.

It will be observed from the foregoing that with this new construction, the use of the shirting material of the front panel is reduced to a minimum, and the reinforcing strip is of a fabric that is less expensive than the material used in the front panel 2. The labor required to make this seam shown in the drawings is very much reduced because of the simple sewing operations used, which are a minimum in number. There is also an additional saving over the center plait type of construction, because when using fabrics that have a pattern or stripe, there is no need for a separate cutting of the center plait strip and the matching of stripes or patterns. This means that the fabric of the panels can be cut in quantities or many layers in one operation, without regard to pattern or stripe, and there is a saving due to the elimination of the manual work that would be required in matching patterns and stripes.

It will be understood that various changes in the details and arrangements of parts, which have been herein described and illustrated in order to explain the nature of the invention, may be made by those skilled in the art within the principle and scope of the invention as expressed in the appended claims.

I claim:

1. A garment having fabric panels with edges overlapping and forming a closure, a marginal area of the panel which is outermost at the overlapping areas being folded back upon itself between the overlapping panels to define an infolded strip beneath an outer layer and along a line of fold forming a free edge of said one panel, a reinforcing fabric strip disposed within the fold, running lengthwise of and in approximate alignment with [the] *said infolded* strip, and having a width approximately co-extensive with the width of said infolded strip, the free edge portion of the infolded strip being turned inwardly between the *body portion of the* strips, the reinforcing strip being provided with a fold disposed in approximate alignment with the fold of said inwardly turned, free edge portion of the infolded strip, said fold of said reinforcing strip being disposed against the said folded edge portion of the infolded strip and united thereto by [a line of stitching] *a first line of stitching through said infolded strip and reinforcing strip only*, the reinforcing strip being also united *but only* [by a line of stitching] to the infolded *strip by a further line of stitching located near the said line of fold and parallel to said* [strip near the said line of fold and parallel to said] first line of stitching, and button hole stitching formed in and uniting said outer layer, said reinforcing strip, and said infolded strip, and disposed between said lines of stitching.

2. A garment having fabric panels with edges overlapping and forming a closure, a marginal area of the panel which is outermost at the overlapping areas being folded back upon itself between the overlapping panels to define an infolded strip beneath an outer layer and along a line of fold forming a free edge of said one panel, a reinforcing fabric strip disposed within the fold, running lengthwise of and in approximate alignment with [the] *said infolded* strip, and having a width approximately co-extensive with the width of said infolded strip, the free edge portion of the infolded strip being turned inwardly between the *body portion of the* strips, the edges of said reinforcing strip being stitched along both of its side edge portions to said infolded strip *only*, and button hole stitching formed in and uniting said outer layer, said reinforcing strip, and said infolded strip, and disposed between said stitched side edges of said reinforcing strip.

3. The garment as set forth in claim 2, said reinforcing strip comprising a strip of fabric folded lengthwise at approximately midway between its sides, and disposed with its line of fold approximately aligned with the fold of said inwardly turned, free edge of said infolded strip.

[4. The garment as set forth in claim 2, said reinforcing strip having its edge that lies along said inwardly turned free edge portion of the infolded strip, disposed between said infolded strip and its said inwardly turned free edge portion.]

5. The garment as set forth in claim 2, said reinforcing strip having its edge portion along said infolded strip turned back upon itself along and *overlapping* [abutting] said inturned free edge portion of the infolded strip.

*6. A garment having fabric panels with edges overlapping and forming a closure, a marginal area of the panel which is outermost at the overlapping areas being folded back upon itself between the overlapping panels to define an infolded strip beneath an outer layer and along a line of fold forming a free edge of said one panel, a reinforcing fabric strip disposed within the fold, running lengthwise of and in approximate alignment with said infolded strip, and having a width approximately co-extensive with the width of said infolded strip, the free edge portion of the infolded strip being turned inwardly and being disposed between said reinforcing fabric strip and said outer layer, said reinforcing strip having that edge which lies along said inwardly turned free edge portion of the infolded strip, disposed between said infolded strip and the inwardly turned free edge portion thereof, the edges of said reinforcing strip being stitched along both of the side edge portions thereof to said infolded strip only, and buttonhole stitching formed in and uniting said outer layer, said reinforcing strip, and said infolded strip, and disposed between said stitched side edges of said reinforcing strip.*

References Cited in the file of this patent or the original patent

UNITED STATES PATENTS

| | | |
|---|---|---|
| 1,570,208 | Cronin | Jan. 19, 1926 |
| 2,313,521 | Di Iuglio | Mar. 9, 1943 |
| 2,334,685 | Almond et al. | Nov. 16, 1943 |
| 2,410,759 | Saller | Nov. 5, 1946 |
| 2,601,035 | Liebowitz | June 17, 1952 |
| 2,607,921 | Jones | Aug. 26, 1952 |

FOREIGN PATENTS

| | | |
|---|---|---|
| 479,374 | Great Britain | Feb. 4, 1938 |